United States Patent
Guttman et al.

(10) Patent No.: US 8,364,790 B2
(45) Date of Patent: Jan. 29, 2013

(54) METHOD AND APPARATUS FOR PRODUCTION AND USE OF DECORATED NETWORKING IDENTIFIER

(75) Inventors: Erik Guttman, Waibstadt (DE); Tae-Sun Yeoum, Seoul (KR); Han-Na Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 85 days.

(21) Appl. No.: 12/484,446

(22) Filed: Jun. 15, 2009

(65) Prior Publication Data
US 2009/0313356 A1    Dec. 17, 2009

Related U.S. Application Data

(60) Provisional application No. 61/061,137, filed on Jun. 13, 2008, provisional application No. 61/082,532, filed on Jul. 22, 2008.

(51) Int. Cl.
*G06F 15/177* (2006.01)
(52) U.S. Cl. ......... 709/220; 709/203
(58) Field of Classification Search ......... 709/220, 709/203
See application file for complete search history.

(56) References Cited

U.S. PATENT DOCUMENTS

| | | | |
|---|---|---|---|
| 6,769,000 B1 * | 7/2004 | Akhtar et al. ......... | 1/1 |
| 2004/0153525 A1 * | 8/2004 | Borella ......... | 709/217 |
| 2005/0064845 A1 * | 3/2005 | Clingerman et al. ......... | 455/408 |
| 2006/0258356 A1 * | 11/2006 | Maxwell et al. ......... | 455/436 |
| 2007/0124490 A1 * | 5/2007 | Kalavade et al. ......... | 709/230 |
| 2007/0297439 A1 * | 12/2007 | Ihattula ......... | 370/445 |
| 2008/0117884 A1 * | 5/2008 | Ishii et al. ......... | 370/338 |
| 2008/0235383 A1 * | 9/2008 | Schneider ......... | 709/229 |
| 2009/0313356 A1 * | 12/2009 | Guttman et al. ......... | 709/220 |
| 2010/0046434 A1 * | 2/2010 | Weniger et al. ......... | 370/328 |
| 2010/0199332 A1 * | 8/2010 | Bachmann et al. ......... | 726/4 |
| 2010/0323700 A1 * | 12/2010 | Bachmann et al. ......... | 455/436 |

OTHER PUBLICATIONS

R. Aboba, "The Network Access Identifier", RFC 4282, Network Working Group, Dec. 2005, 11 pages.*

* cited by examiner

*Primary Examiner* — Ario Etienne
*Assistant Examiner* — Michael C Lai
(74) *Attorney, Agent, or Firm* — The Farrell Law Firm, P.C.

(57) ABSTRACT

A method and apparatus are provided for producing a decorated networking identifier at a client terminal for transmission to a server side element. The networking identifier is obtained at the client terminal. The networking identifier is appended with one or more extensible decorations at the client terminal creating the decorated networking identifier. The one or more extensible decorations are separated from the networking identifier by a first predetermined character. The one or more decorations each include a decoration sequence and an identifier corresponding to the decoration sequence. The identifier and the decoration sequence are separated by a second predetermined character. The decorated networking identifier is transmitted from the client terminal to the server side element.

16 Claims, 3 Drawing Sheets

METHOD AND APPARATUS FOR PRODUCTION AND USE OF DECORATED NETWORKING IDENTIFIER

PRIORITY

This application claims priority under 35 U.S.C. §119(e) to a Provisional U.S. Patent Application filed on Jun. 13, 2008 and assigned Ser. No. 61/061,137, and a Provisional U.S. Patent Application filed on Jul. 22, 2008 and assigned Ser. No. 61/082,532, the disclosures of which are incorporated herein by reference.

BACKGROUND OF THE INVENTION

1. Field of the Invention

The present invention relates generally to a syntax for networking identifier decorations, and more particularly, to a method and apparatus for the production and use of decorated networking identifiers.

2. Description of the Related Art

An Access Point Name (APN) is a networking identifier that is used to identify a particular network service, such as, for example, the Internet or a private network. A client terminal, or a User Equipment (UE), supplies the APN when connecting to a network and obtaining specific resources for the connection. The network associated with the APN is usually described as a Packet Data Network (PDN).

The general form of an APN, as provided in Third Generation Partnership Project (3GPP) TS 23.003, is:

<APN Network Identifier>"."<APN Operator Identifier>

The network identifier is shown first, and the operator identifier is a Domain Name System (DNS) name corresponding to an operator. Before 3GPP release 8, the two parts together corresponded to the DNS name of a Gateway General Packet Radio Service (GPRS) Support Node (GGSN).

The APN, in the form of a well-structured DNS name (see, for example, RFC 1035, RFC 1123, RFC 2181), has additional constraints. The APN has a maximum length of 100 octets, and the APN consists of one or more labels. The network identifier does not start with the strings "rac", "lac", "sgsn", "mc", nor end in ".gprs", nor take the value "*". The operator identifier takes the form "mnc<MNC>.mcc<MCC>.gprs" (although .gprs may change in the future).

The APN is used to identify a particular network that the client terminal wishes to access, and which is offered by an operator. The operator is typically a home operator of the client terminal; however, it may also be a visited operator in the case of local breakout scenarios. It is possible to omit the operator identifier from the general form of the APN. In such a scenario, the DNS in the Public Land Mobile Network (PLMN) translates the APN network identifier into the 'default' GGSN for the network identifier provided.

In the past, an APN directly identified an association between the client terminal and a PDN. The client terminal could attach to multiple PDNs (using different APNs), but was only allowed one connection to each PDN. In the 3GPP System Architecture Evolution (SAE) architecture for the enhanced packet core, it is possible for the client terminal to attach to the same PDN more than once, for example, to support a client terminal with multiple addresses. This characteristic is useful in supporting a 'split terminal' by means of an integrated terminal. For example, a laptop could make use of the Long Term Evolution (LTE) connection obtained by means of a cell phone.

However, a problem exists with respect to a multiple PDN connection from the same terminal to the same PDN, in that it is not possible for the client terminal to identify an individual connection by means of the APN alone. It is necessary for the client terminal to identify these connections in order to terminate them. It has been suggested that a form of decoration be used on the APN, so that the APN (first, second, third, etc.) may be identified. The suggested syntax, using Augmented Backus-Naur Form (ABNF), as described in RFC 4234, is:

APN=1*label
label=; A DNS label, as described in RFC 1035
index-decorated-APN=APN ";" index
index=DIGIT
  ; An 'index' indicates a PDN connection in the case
  ; that a terminal has more than one PDN connection
  ; to the same PDN identified by the APN string.

For example, the decorated APN "Internet.mnc012.mcc345.gprs;1" would identify a first connection, while the decorated APN "Internet.mnc012.mcc345.gprs;2" would identify a second connection.

APN decoration has not yet been formally defined in 3GPP specifications. It must be specified that the decoration be removed before processing, and used for other purposes. The only existing proposal to decorate APNs is for the purpose of identifying and distinguishing PDNs; however, the need for additional extensions are likely in the future, since these extensions provide one of the easiest ways for the client terminal to signal information to the core network.

A fundamental problem with the suggested APN decoration scheme is that it will not be compatible with future decorations, in that future decoration schemes will require a revision of the previous standard. It will be very difficult to provide additional decorations to the APN since parsers will expect only an APN or an index-decorated-APN. This means that a new decoration applied to an APN in the future will be incompatible with existing parsers built for APNs or index-decorated-APNs.

In determining standards for decorating the APN, the following constraints must be considered. The basic syntax of the APN string is defined in 3GPP TS 23.003, and the syntax of the elements of the APN string is defined by RFC 1035. The syntax of the decorations is not yet constrained as there are no examples yet standardized. The size of the APN limited to 100 bytes. The basic structure of the APN must not be obscured or difficult to recover.

A Network Access Identifier (NAI) is a second type of networking identifier, specifically an Internet Engineering Task Force (IETF) standard identifier that is used in initiating, authenticating, and authorizing network access required for applications, such as a Virtual Private Network (VPN), Voice over Internet Protocol (VoIP), Fourth Generation (4G) mobile communications, dial-up access, etc. The NAI includes the user identity information and the operator information, in a form similar to that of an email address: Identity@Operator. The NAI syntax is:

```
nai = username / (username "@" realm)
username = dot-string
dot-string = string / (dot-string) "." string
string = char / (string char)
char = c / ("\" x)
c = < any 128 ASCII characters except special or SP >
x = %x00-7F
```

-continued

```
              ; All 127 ASCII characters, no exception
    SP = %x20
              ; Space character
    special = ; a list of reserved characters
            ; this list does not include "#", ":". "|" or "~"
```

Many applications require information before authentication and authorization procedures may commence; however, there exists only two ways to insert this information. First, the information may be included in an extension, or decoration, of the NAI. Second, the information may be included through specialization of the authorization and authentication procedure. NAI decoration is easier to define and standardize than specialized authorization and authentication procedures. A decorated NAI may take the form of: {ip=12.34.56.78}joe@example.com Applications require a software stack (multiple layers), where each layer may require a decoration. Thus, multiple NAI decorations conflict, which complicates standardization. There is no general way to allow for arbitrary decoration that guarantees conflicts do not arise.

In determining standards for NAI decorations, the existing syntax and size of NAI should be considered. Further, the decorations must not obscure the NAI.

SUMMARY OF THE INVENTION

The present invention has been made to address at least the above problems and/or disadvantages and to provide at least the advantages described below. The embodiments of the present invention make it possible to solve the fundamental problem described above by using an explicit labeling scheme for decorations. The labeling scheme allows arbitrary decorations to be added to networking identifiers without conflicting with each other or defeating the purpose of the networking identifier. Elements interpreting the networking identifier decoration may recognize it and employ it in processing, or fail to recognize it and discard the decoration. Accordingly, an aspect of the present invention provides a method and an apparatus for producing a decorated networking identifier at a client terminal for transmission to a server side element.

Another aspect of the present invention provides a method and an apparatus for processing a decorated networking identifier at a server side element.

A further aspect of the present invention provides a system for producing and processing a decorated networking identifier.

According to one aspect of the present invention, a method is provided for producing a decorated networking identifier at a client terminal for transmission to a server side element. The networking identifier is obtained at the client terminal. The networking identifier is appended with one or more extensible decorations at the client terminal creating the decorated networking identifier. The one or more extensible decorations are separated from the networking identifier by a first predetermined character. The one or more decorations each include a decoration sequence and an identifier corresponding to the decoration sequence. The identifier and the decoration sequence are separated by a second predetermined character. The decorated networking identifier is transmitted from the client terminal to the server side element.

According to another aspect of the present invention, a method is provided for processing a decorated networking identifier at a server side element. The decorated networking identifier is received at the server side element from a client terminal. One or more extensible decorations are removed from the decorated networking identifier at the server side element creating an original networking identifier. The one or more extensible decorations are separated from the networking identifier by a first predetermined character. The one or more decorations each include a decoration sequence and an identifier corresponding to the decoration sequence. The identifier and the decoration sequence are separated by a second predetermined character According to a further aspect of the present invention, a client terminal is provided for producing a decorated networking identifier that obtains the networking identifier, appends the networking identifier with one or more extensible decorations creating the decorated networking identifier, and transmits the decorated networking identifier to the server side element. The one or more extensible decorations are separated from the networking identifier by a first predetermined character. The one or more decorations each include a decoration sequence and an identifier corresponding to the decoration sequence. The identifier and the decoration sequence are separated by a second predetermined character.

According to an additional aspect of the present invention a server side element is provided for processing a decorated networking identifier that receives the decorated networking identifier from a client terminal, and removes one or more extensible decorations from the decorated networking identifier creating an original networking identifier. The one or more extensible decorations are separated from the networking identifier by a first predetermined character. The one or more decorations each include a decoration sequence and an identifier corresponding to the decoration sequence. The identifier and the decoration sequence are separated by a second predetermined character.

According to another aspect of the present invention a system is provided for producing and processing a decorated networking identifier. The system includes a client terminal that obtains the networking identifier, appends the networking identifier with one or more extensible decorations creating the decorated networking identifier, and transmits the decorated networking identifier to a server side element. The system also includes the server side element that receives the decorated networking identifier from the client terminal, and removes one or more extensible decorations from the decorated networking identifier creating an original networking identifier. The one or more extensible decorations are separated from the networking identifier by a first predetermined character. The one or more decorations each include a decoration sequence and an identifier corresponding to the decoration sequence. The identifier and the decoration sequence are separated by a second predetermined character.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION OF PREFERRED EMBODIMENTS

Figure 1:
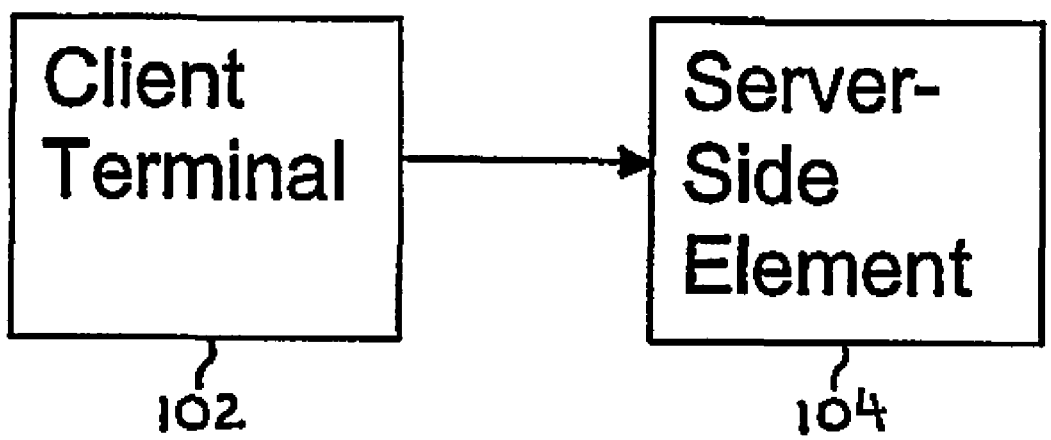
FIG. 1 is a block diagram illustrating a system for production and processing of a decorated networking identifier, according to an embodiment of the present invention.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are merely used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

In the following description, the embodiments of present invention provide a method, apparatus and system for producing and processing a decorated networking identifier. Referring initially to FIG. 1, a block diagram illustrates a system for production and processing of decorated networking identifiers, according to an embodiment of the present invention. A client terminal 102, or UE, produces the decorated networking identifier and transmits the decorated networking identifier to a server side element 104.

A networking identifier may take a variety of forms. Embodiments of the present invention describing the decoration of two such networking identifiers, an APN and an NAI, are provided below. However, the scope of the present invention is not limited to those specific networking identifiers alone.

A decoration convention is provided herein for APNs that does not conflict with the constraints described above. The convention will conform to the standard and allow further standards specifications to interwork with each other. Thus, decorations, including those not yet invented, will not conflict with those introduced using this convention.

This embodiment of the present invention provides a labeled list of APN decorations in a regular format. The labeled list identifies the beginning and end of a decoration, optionally, the authority responsible for the decoration's interpretation, and an identifier for the decoration itself, to aid in its interpretation, distinguish it from other decorations and allow the interpreter to ignore the decoration if it is not understood.

Figure 2:
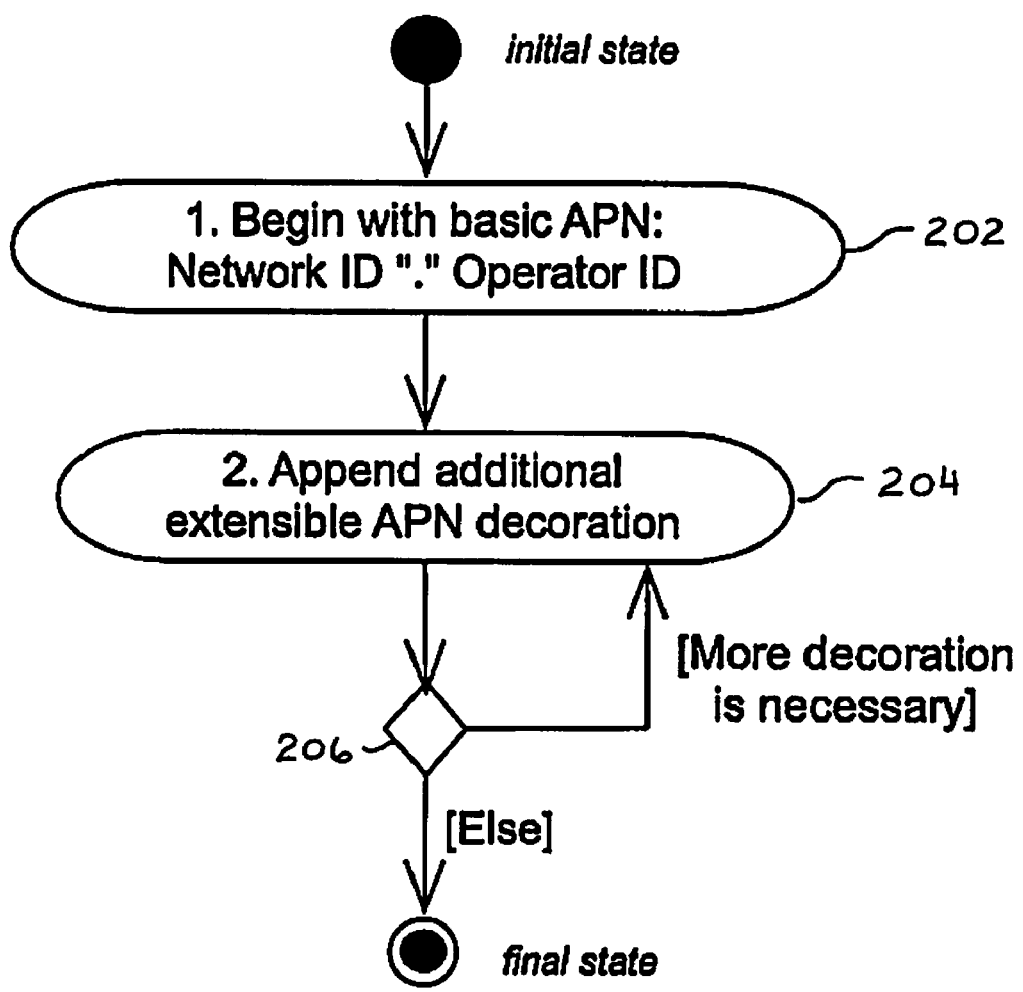
FIG. 2 is a flow diagram illustrating a decorated APN production methodology, according to an embodiment of the present invention.

Referring now, to FIG. 2, a flow diagram illustrates a decorated APN production methodology, according to an embodiment of the present invention. In block 202, the client begins with a basic APN in the format described above. In block 204, the client appends an extensible APN decoration to the basic APN. In block 206, it is determined if more decorations are necessary.

NAI decorations would be useful for indicating to the authorization system any special treatment that is required for the authorization to proceed selectively or in a special way. Some examples of these include: a special 'low security' "non-authenticated" mode; authentication requiring a special authority other than or in addition to the 'realm' included in the NAI; input parameters or selection information that might be needed for an authorization procedure (many authorization procedures are 'fixed' by standards and non-extensible, so this would be the only feasible way to introduce additional parameters); some indication of the capabilities sought by the client seeking authorization; perhaps other applications as well. These use cases are not dependent—they could apply at the same time. For this reason, more than one decoration at the same time could be useful.

Furthermore, APN decorations would be useful for informing the network of parameters from the UE at a time that UE normally is not able to signal information to the network. The APN is 'visible' to the 'control plane' nodes—which means that information present in an APN decoration could be used by several entities in the network to control behavior. Examples of use cases of APN decorations include parameterizing normal attach and additional PDN connection procedures. APNs are used to select services that the UE will access. There are many semantic options that are being added to general service connectivity—for example, whether to apply a local breakout connection even if this means mobility is not supported. Again, multiple scenarios are not exclusive and there could be a list of APN decorations present.

If more decorations are necessary, the methodology returns to block 204, and if more decorations are not necessary, the methodology terminates. Thus, the methodology repeats for as many decorations the client must include, although there is a practical limit to this repetition with respect to the maximum number of octets that may be transmitted.

For the NAI Decoration—For example, the practical limit to the number of octets allowed in a NAI is determined by a technical standard such as RFC 4282 and is 72 characters. Thus, the NAI decorations will have to be quite short in any case especially if more than one decoration is to be added.

The result of this procedure is the decorated APN.

Figure 3:
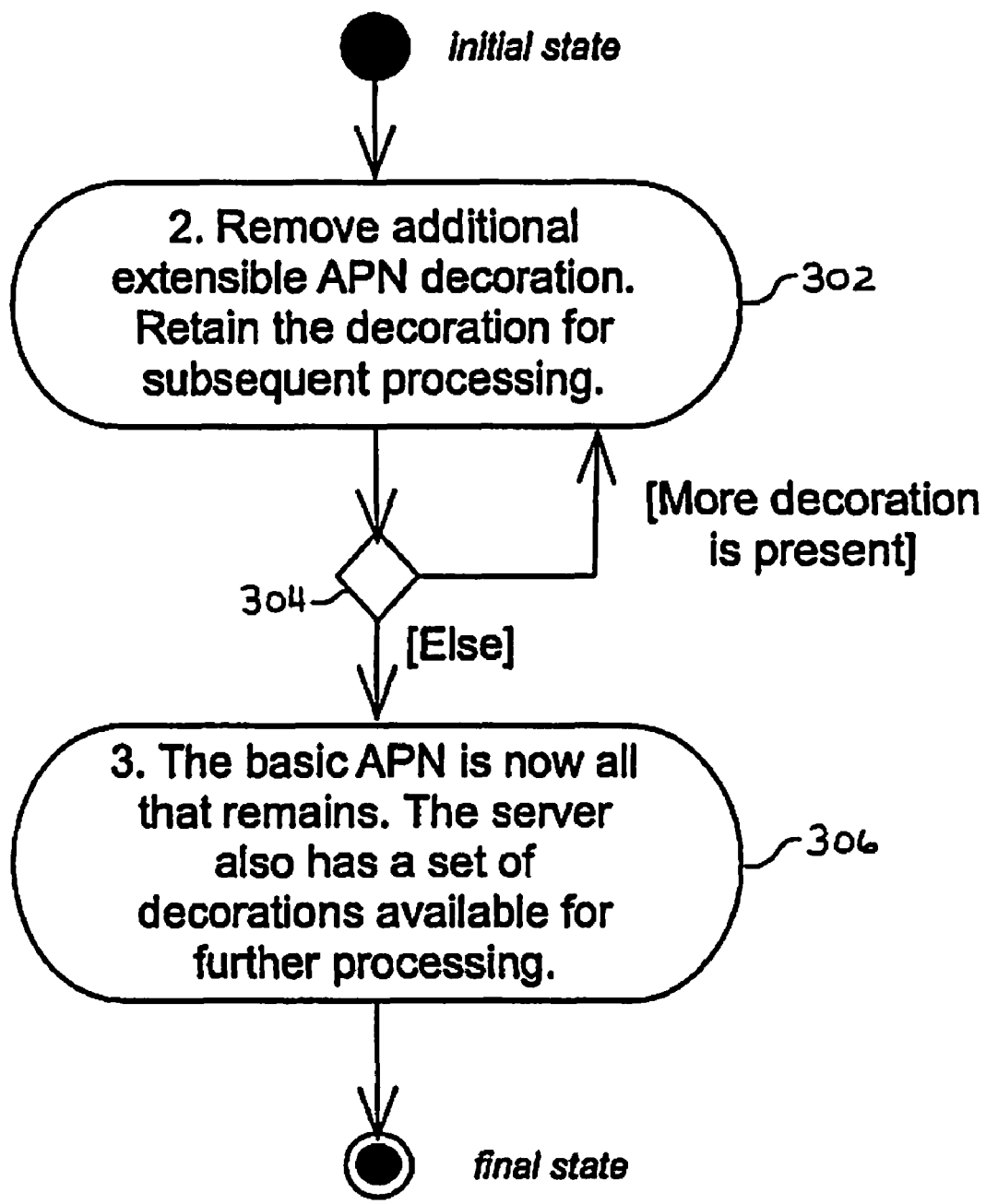
FIG. 3 is a flow diagram illustrating a decorated APN processing methodology, according to an embodiment of the present invention.

Referring now to FIG. 3, a flow diagram illustrates a decorated APN processing methodology, according to an embodiment of the present invention. In block 302, a core network element, or server side element, processing the decorated APN removes an extensible APN decoration. The decoration is retained for further processing.

The reason that the decoration is included with the APN is so that additional processing is possible. The algorithm described extracts the decoration and allows for subsequent interpretation and use by the entity that extracted it.

The server-side element may obtain the decoration list without interference between different APNs and their particular syntax. In block 304, it is determined if more decorations are present. If more decorations are present, the methodology returns to block 302 for their removal. If more decorations are not present, the methodology continues to block 306, where all that remains is the basic APN, after which the methodology terminates. In accordance with the methodology, the core network element is provided with the APN for normal processing, as well as the list of decorations for specific processing. These decorations are labeled as described below to allow the core network element to properly interpret them in an unambiguous manner, or to ignore decorations that are not understood.

The syntax of an APN is provided in 3GPP TS 23.003. It is noted that the APN is defined as a series of characters with certain restrictions. Characters permitted in DNS labels are the only ones permitted. Thus, any additional characters may be used as delimiters. Since decorations have not yet been defined, a grammar scheme may be constructed that permits delimiters to be used without any need for backward compatibility. A convention for a decoration list is provided having the following form (the syntax of which conforms to the convention of ABNF as defined in RFC 4234):

```
decoration-list = ";" deco-list
        ; the extension list begins and ends with a ";" character.
deco-list = decoration / (decoration ";" deco-list )
        ; there are one or more extensions, with a ";" demarcation between them.
decoration = ID ":" deco-sequence
        ; each extensible decoration has the form of an ID and a decoration sequence
        ; the decoration sequence is defined externally (e.g. by the WiMAX forum or 3GPP)
        ; a ":" character separates the ID and the decoration sequence
ID = [ ( 1*6 DIGIT "." ) ] *DIGIT
        ; The ID consists of an optional number of one to six digits followed by a ".".
        ; This would identity the standards organization (SDO).
        ; If the SDO number is omitted (as an optimization)
        ; the standards organization is assumed to be 3GPP.
        ; The digits at the end of the represent the identifier of the decoration.
deco-char = %x21-39 / %x3c-5b / %x5d-7d
        ; The sequence shown are all printable ASCII characters except ":", ";" and "\".
        ; Other characters need to be escaped using the convention "\" character.
        ; See RFC4282 for more details.
        ; The ":" and ";" characters are used in the syntax of the decoration list, so they
        ; must be escaped if they are to be used in a decoration. See examples below.
deco-sequence = 1* deco-char
        ; This contains the APN decoration as defined by the SDO or vendor.
        ; Encoding of this decoration must follow the constraints on available characters and
        ; length.
```

The core network element can easily determine the beginning and end of the decoration list by the ";" delimiters. Each decoration in the sequence is separated by a ";" allowing it to be easily parsed. The decoration has an associated ID indicating the authority defining the decoration. For example, the number 1 may correspond to 3GPP and the number 2 may correspond to the WiMAX Forum, etc. An ID may have a suffix that uniquely identifies a particular extension under a given authority. For example "1.1" and "1.2" would identify two different decorations defined by 3GPP. The ID and deco-sequence are separated by a ":". Finally, the deco-sequence can be any decoration whatsoever, with the restrictions that it not be too long (so the total APN decoration list will not exceed the maximum length allowed), and that it not use reserved characters without employing an escape sequence.

Examples of APNs are provided below.
1. apn.nmc012.mcc345.gprs
2. apn.mnc012.mcc345.gprs;1:3
3. apn.mnc012.mcc345.gprs;1:3;2:capability=floo
4. apn.mnc012.mcc345.gprs;1:3;2.1:algorithms=a,c,d
5. apn.mnc012.mcc345.gprs;3:value\:12

In Example 1, a non-decorated APN is shown.

In Example 2, an APN having a single decoration is shown. Because there is no SDO number shown in the ID of the decoration, it is assumed that the SDO is 3GPP. The decoration ID is '1,' which may mean, for example, that a PDN connection number will follow. The PDN connection number is '3'.

In Example 3, an APN having two decorations is shown. The first decoration is similar to that described in example 2. The second decoration is also defined by 3GPP, but has a decoration ID '2', which refers to a client terminal capability list. In this embodiment of the present invention, it is set to the value 'floo'.

In Example 4, unlike the previous examples, the second decoration has the ID "2.1", meaning that it has an SDO identifier ('2') and a decoration identifier ('1'), separated by the character ".". This decoration includes a list of algorithms the client terminal is capable of, such as, for example, as defined by the WiMAX forum.

In Example 5, the decoration ID, defined by 3GPP (as there is no SDO ID present), is number 3. The decoration is "value: 3". Since ":" is not a valid character in the decoration, it must be escaped. The "\" character preceding the ":" satisfies this requirement.

The choice of characters used for the decoration lists ";", ":" and "\" are arbitrary. Alternative embodiments of the present invention may incorporate the use of any three characters. The three characters chosen for this embodiment of the present invention were selected because they allow for ease in readability.

In another embodiment of the present invention an NAI decoration is provided. The decoration provides encoding for multiple extensions without conflict, which is useful in a variety of scenarios. The convention is applied to NAIs as part of the definition of standards allowing extensible NAI. A convention for a decoration for the NAI is provided having the following form:

```
username = ([ext] dot-string / dot-string)
ext = "#" ext-list "#"
        ; the extension list begins and ends with a '#'
ext-list = (first-ext / first-ext "|" ext-list)
        first-ext = ID "~" extension
        ; the first extension always has an ID
ID = 1*6 DIGIT ["." *(ext-char)]
        ; the first digits correspond to an Enterprise Number - the authority
        ;defining the interpretation of the decoration
ext-list = (extension / extension "|" ext-list)
extension = [ID "~"] ext-string
ext-string = ext-char / ext-char ext-string
ext-char = <any 128 ASCII characters except special, SP or ext-reserved >
ext-reserved = %x HEX HEX
        ; Escape character "#", "|" and "~" in 'x' form.
```

Accordingly, examples of NAIs are provided below.
1. joe@example.com
2. #10415~mode=asynch#joe@3gpp.org
3. #10415.1~mode=asynch|10415.2~capability=mixed#joe@3gpp.org
4. #10415.1~mode=asynch|24757={ip=12.34.56.78}#joe@3gpp.org Example 1 provides a basic NAI. Example 2 provides an NAI with a single decoration. Example 3 provides an NAI with a list of 3GPP decorations. Example 4 provides an NAI with a mix of 3GPP and WiMAX decorations. The extensible decorations are appended as a prefix before the NAI. A first character, "#", is disposed at the beginning and the end of the one or more extensible decorations. A second character, "~" separates an identifier from a decoration sequence within an extensible decoration. A third character, "|" separates decorations when there are a plurality of decorations associated with an NAI.

Many standards employ an NAI and require the ability to decorate. However, these decorations must not conflict with other layers, such as for example, application NAI, network NAI, service provider NAI, etc.

The embodiments of the present invention allow independent standards organizations and even vendors to define networking identifier decorations without the risk of confusing an element that complies with the conventions provided, thereby simplifying standardization. Further, the embodiments of the present invention allow for easy extraction and identification of decorations. If a decoration is not supported, it may be safely ignored while others are still used. The embodiments of the present invention do not require any changes to the IETF standard definitions of domain name strings and are compatible with parsers of today.

The embodiments of the present invention are 'future proof' because the decorations defined using the convention will not conflict with decorations defined in the future. Additions of new decorations do not require revision of previously defined specifications. Finally, in accordance with the embodiments of the present invention, both the client and server side are simplified in that they need only a single parser for decorations, rather than specialized parsers for each combination of decorations.

While the invention has been shown and described with reference to certain preferred embodiments thereof, it will be understood by those skilled in the art that various changes in form and detail may be made therein without departing from the spirit and scope of the invention as defined by the appended claims and their equivalents.

What is claimed is:

1. A method for producing a decorated networking identifier at a client terminal for transmission to a server side element, the method comprising the steps of:
   obtaining a networking identifier at the client terminal;
   appending the networking identifier with one or more extensible decorations at the client terminal creating the decorated networking identifier, wherein the one or more extensible decorations are separated from the networking identifier by a first predetermined character, the one or more extensible decorations each comprise a decoration sequence and an identifier corresponding to the decoration sequence, and the identifier and the decoration sequence in each of the one or more extensible decorations are separated by a second predetermined character; and
   transmitting the decorated networking identifier from the client terminal to the server side element,
   wherein the decorated networking identifier comprises a Network Access Identifier (NAI) having user identity information and operator information,
   wherein the one or more extensible decorations are appended as a prefix before the NAI, and
   wherein the first predetermined character is disposed at the beginning and the end of the one or more extensible decorations.

2. The method of claim 1, wherein the decorated networking identifier does not conflict with other decorated networking identifiers.

3. The method of claim 1, wherein the networking identifier comprises an Access Point Name (APN) having an APN networking identifier and an APN operator identifier.

4. The method of claim 3, wherein the one or more extensible decorations are appended as a suffix to the networking identifier.

5. The method of claim 3, wherein the decoration sequence of each of the one or more extensible decorations is defined externally.

6. The method of claim 3, wherein the identifier comprises an identifier of each of the one or more extensible decorations.

7. The method of claim 6, wherein the identifier further comprises an identifier of a standards organization for interpreting the extensible decoration that is disposed before and separated from the identifier of each of the one or more extensible decorations by a third predetermined character.

8. The method of claim 7, wherein the first predetermined character is a ";", the second predetermined character is a ":", and the third predetermined character is a ".".

9. The method of claim 3, wherein the one or more extensible decorations comprise a plurality of extensible decorations and each of the plurality of extensible decorations are separated by the first predetermined character.

10. The method of claim 1, wherein the one or more extensible decorations comprise a plurality of decorations and each of the plurality of decorations are separated by a third predetermined character.

11. The method of claim 10, wherein the first predetermined character is a "#", the second predetermined character is a "~", and the third predetermined character is a "|".

12. A method for processing a decorated networking identifier at a server side element comprising the steps of:
   receiving the decorated networking identifier at the server side element from a client terminal; and
   removing one or more extensible decorations from the decorated networking identifier at the server side element creating an original networking identifier, wherein the one or more extensible decorations are separated from the original networking identifier by a first predetermined character, the one or more extensible decorations each comprise a decoration sequence and an identifier corresponding to the decoration sequence, and the identifier and the decoration sequence in each of the one or more extensible decorations are separated by a second predetermined character,
   wherein the decorated networking identifier comprises a Network Access Identifier (NAI) having user identity information and operator information, wherein the one or more extensible decorations are appended as a prefix before the NAI, and
   wherein the first predetermined character is disposed at the beginning and the end of the one or more extensible decorations.

13. The method of claim 12, further comprising at least one of processing at least one of the removed one or more extensible decorations in accordance with the corresponding identifier and decoration sequence, and discarding at least one of the removed one or more extensible decorations that are not understood by the server side element.

14. A client terminal for producing a decorated networking identifier, the client terminal comprising:
   a processor for obtaining a networking identifier, appending the networking identifier with one or more extensible decorations creating the decorated networking identifier, and transmitting the decorated networking identifier to a server side element, wherein the one or more extensible decorations are separated from the networking identifier by a first predetermined character, the one or more extensible decorations each comprise a decoration sequence and an identifier corresponding to the decoration sequence, and the identifier and the decoration sequence in each of the one or more extensible decorations are separated by a second predetermined character, wherein the decorated networking identifier comprises a Network Access Identifier (NAI) having user identity information and operator information, wherein the one or more extensible decorations are appended as a prefix before the NAI, and wherein the first predetermined character is disposed at the beginning and the end of the one or more extensible decorations.

15. A server side element for processing a decorated networking identifier, the server side element comprising:

a processor for receiving the decorated networking identifier from a client terminal, and removing one or more extensible decorations from the decorated networking identifier creating an original networking identifier, wherein the one or more extensible decorations are separated from the original networking identifier by a first predetermined character, the one or more decorations each comprise a decoration sequence and an identifier corresponding to the decoration sequence, and the identifier and the decoration sequence in each of the one or more extensible decorations are separated by a second predetermined character, wherein the decorated networking identifier comprises a Network Access Identifier (NAI) having user identity information and operator information, wherein the one or more extensible decorations are appended as a prefix before the NAI, and wherein the first predetermined character is disposed at the beginning and the end of the one or more extensible decorations.

16. A system for producing and processing a decorated networking identifier comprising:

a client terminal that obtains a networking identifier, appends the networking identifier with one or more extensible decorations creating the decorated networking identifier, and transmits the decorated networking identifier to a server side element; and the server side element that receives the decorated networking identifier from the client terminal, and removes one or more extensible decorations from the decorated networking identifier creating an original networking identifier, wherein the one or more extensible decorations are separated from the original networking identifier by a first predetermined character, the one or more extensible decorations each comprise a decoration sequence and an identifier corresponding to the decoration sequence, and the identifier and the decoration sequence in each of the one or more extensible decorations are separated by a second predetermined character, wherein the decorated networking identifier comprises a Network Access Identifier (NAI) having user identity information and operator information, wherein the one or more extensible decorations are appended as a prefix before the NAI, and wherein the first predetermined character is disposed at the beginning and the end of the one or more extensible decorations.

* * * * *